United States Patent [19]

Chiang

[11] 4,049,786

[45] Sept. 20, 1977

[54] PROCESS OF PREPARING PEROXYMONOSULFATE

[75] Inventor: John S. Chiang, Mercerville, N.J.

[73] Assignee: FMC Corporation, Philadelphia, Pa.

[21] Appl. No.: 723,188

[22] Filed: Sept. 13, 1976

[51] Int. Cl.$^2$ ............................................. C01B 15/08
[52] U.S. Cl. ..................................... 423/513; 423/521
[58] Field of Search ................................ 423/513, 521

[56] References Cited

U.S. PATENT DOCUMENTS

| | | | |
|---|---|---|---|
| 2,663,621 | 11/1953 | Greenspan et al. | 423/265 |
| 2,701,178 | 2/1955 | Fell | 8/128 |
| 2,739,034 | 3/1956 | Fell | 8/128 |
| 2,789,954 | 4/1957 | Fell | 252/186 |
| 2,901,319 | 8/1959 | D'Addieco | 423/513 |
| 2,926,998 | 3/1960 | D'Addieco et al. | 423/521 |
| 2,955,020 | 10/1960 | Darbee et al. | 423/513 |
| 3,002,813 | 10/1961 | Darbee et al. | 423/513 |
| 3,042,488 | 7/1962 | Hildon et al. | 423/513 |
| 3,203,756 | 8/1965 | Hildon et al. | 423/513 |
| 3,556,711 | 1/1971 | Stalter | 8/111 |

FOREIGN PATENT DOCUMENTS

| | | | |
|---|---|---|---|
| 553,525 | 2/1958 | Canada | 423/513 |

OTHER PUBLICATIONS

Price "Per-Acids and their Salts" Longmans, Green & Co., London, 1912 pp. 45–58.

*Primary Examiner*—Jack Cooper
*Attorney, Agent, or Firm*—R. D. Jackson; F. Ianno

[57] ABSTRACT

High strength peroxymonosulfate is prepared by adding concentrated sulfuric acid to a solution of a soluble peroxydisulfate whereby the heat of solvation of the sulfuric acid hydrolyzes the peroxydisulfate to the peroxymonosulfate; the temperature is controlled to provide a range of about 140° to 160° F. After about 15 to 45 minutes, the solution is cooled rapidly to about room temperature.

3 Claims, No Drawings

PROCESS OF PREPARING PEROXYMONOSULFATE

This invention relates to peroxymonosulfates and particularly to an improved method of preparing them by the rapid hydrolysis of persulfates.

Peroxymonosulfates, together with the parent peroxymonosulfuric acid or Caro's acid, constitute a known class of peroxy compounds which are documented extensively in the technical and patent literature. They are powerful oxidizers being superior in this respect to the less reactive peroxides such as hydrogen peroxide. One specifically promising area of application is the substitution of peroxymonosulfuric acid for chlorine to decompose cyanide residues from electroplating operations. Other oxidative applications include various bleaching processes, aluminum treatment, and wool shrinkproofing.

Despite their recognized efficiency as oxidizing agents, peroxymonosulfates are not generally available on the chemical market since as a class they tend to be very unstable except for the triple salt of potassium peroxymonosulfate, a crystalline complex salt of the formula $2KHSO_5 \cdot KHSO_4 \cdot K_2SO_4$ which is sold commercially. However, only two out of four molecules in the triple salt of potassium peroxymonosulfate are active, the remaining two are inert. The triple salt is stable only when it is completely dry i.e., it should be essentially devoid of free water and of water loosely held in the form of water of hydration (see U.S. Pat. No. 3,556,711, Col. 2, line 50). In commercial practice, this salt is kept in the presence of a desiccant material in particulate form to protect against the presence of free water due to moisture picked up from the atmosphere. This desiccant material further diminishes the activity of this product. A few years ago, peroxymonosulfuric was introduced on the chemical market in the form of a 20% solution.

Peroxymonosulfates can be prepared in several ways, the most common of which are the following:

1. Reaction of sulfuric acid and hydrogen peroxide according to the equation:

$$H_2SO_4 + H_2O_2 \rightarrow H_2SO_5 + H_2O$$

In actual practice, there is produced an equilibrium mixture containing peroxymonosulfuric acid. The equilibrium conditions are such that the reaction is incomplete and large excess of reagent must be used. For instance, in order to prepare a 20% solution of $H_2SO_5$, one must use a five fold amount of sulfuric acid and a 12% excess of hydrogen peroxide over the stoichiometric requirements. The reaction evolves so much heat that it poses large scale operation difficulties in keeping the temperature within the desired limits.

2. Peroxymonosulfuric acid can be prepared by reacting chlorosulfonic acid and hydrogen peroxide as follows:

$$HSO_3Cl + H_2O_2 \rightarrow H_2SO_5 + HCl$$

but this scheme is not suitable for large scale preparation because of heat evolution during the reaction.

3. Hydrolysis of peroxydisulfates according to the equation:

$$H_2S_2O_8 + H_2O \rightarrow H_2SO_5 + H_2SO_4$$

While a concurrent reaction is the hydrolysis of peroxymonosulfuric acid according to the equation:

$$H_2SO_5 + H_2O \rightarrow H_2SO_4 + H_2O_2$$

4. Electrolyzing a sulfuric acid solution yields peroxymonosulfuric acid in the anolyte. The peroxymonosulfuric acid is not formed directly but its presence is due to the hydrolysis of peroxydisulfuric acid. This procedure is not commercially useful because the conditions for efficient electrolysis and proper hydrolysis are different. Attempting to do both reactions simultaneously results in low current efficiency and poor yields.

From the foregoing, it is evident that the commercialization of peroxymonosulfates is not likely to come about given the present state of the art. What is needed is a simple method of generating peroxymonosulfates at the point of application with minimal active oxygen losses from side reactions.

It has been discovered that the desideratum aforesaid can be realized by a novel modification in the production of peroxymonosulfates from the hydrolysis of peroxydisulfates comprising the steps of:

a. providing a solution of a peroxydisulfate at about 100° F;

b. mixing the peroxydisulfate solution of step (a) with concentrated sulfuric acid in a volume ratio of 1 to 0.07 to 1 to 0.15 whereby the heat of solvation of the sulfuric acid rapidly hydrolyzes the peroxydisulfate to produce a solution temperature between about 140° to 160° F;

c. maintaining the resulting temperature of about 140 to 160° F for about 5 to 45 minutes; and d. rapidly cooling the solution to about room temperature.

In carrying out the invention, a peroxydisulfate solution is prepared by dissolving a soluble peroxydisulfate salt in water and bringing the temperature of the solution to about 100° F. A convenient procedure consists in dissolving the persulfate in hot water at about 140° F whereby the endothermic heat of dissolution lowers the temperature to the vicinity of 100° F. The concentration of the persulfate is not critical and solutions ranging from 0.1 m/l to saturation give satisfactory results. A preferred concentration is about 2 m/l since this provides minimum volume for easy handling while maximizing peroxymonosulfate yield for a given quantity of sulfuric acid. Any soluble peroxydisulfate is suitable, although for reasons of solubility and economy, sodium and ammonium peroxydisulfate are preferred and ammonium peroxydisulfate is most preferred.

The concentrated sulfuric acid should be sufficiently high to provide the desired heat of hydration directly; a convenient source is commercial 98% acid. To the approximately 100° F solution of persulfate is added concentrated sulfuric acid in a ratio of 1 volume of the persulfate solution to 0.07 to 0.15 volume of concentrated sulfuric acid under conditions whereby the heat of solvation of the sulfuric acid rapidly initiates the hydrolysis reaction and produces a temperature range of about 140° to 160° F. The hydrolysis of the peroxydisulfate to the peroxymonosulfate proceeds rapidly at the temperature aforesaid, occuring to the extent of 50% to 80% in 15 minutes and is substantially complete in 30 to 45 minutes. Within the first 15 minute reaction period, essentially no hydrogen peroxide is formed. As the conversion proceeds to completion, the hydrogen peroxide content rises, thereby limiting the net conversion to about 80%. Accordingly, the overall practical reaction time can vary from about 5 to 45 minutes while the preferred range is about 15 to 20 minutes.

As above pointed out, the hydrolysis of the peroxydisulfate is conducted under conditions whereby the heat of solvation is utilized to initiate and sustain the reaction and to this end an insulated reaction zone may be used, particularly for small scale reactors where heat losses are proportionately greater than with large vessels. The reaction zone is also provided with cooling means in order to control the upper temperature range. Desirably, the reaction vessel is chosen in which heat losses are minimal while providing the temperature range for the hydrolysis. For laboratory scale runs, a Dewar flask serves as an excellent vessel for retaining reaction heat. An insulated vessel can also be used while large reactors may retain sufficient heat without extraneous insulation. Such thermal characteristics can readily be established by conducting a few trial runs.

After the hydrolysis has reached about 80% conversion, the reaction is rapidly cooled to room temperature and so maintained preparatory to being used.

The hydrolysis of peroxydisulfates in acid media is generally conceded to proceed in accordance with the following scheme:

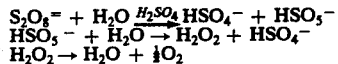

As will be observed, by the time all the peroxydisulfate has been hydrolyzed, a certain amount of the peroxymonoacid formed has been decomposed giving hydrogen peroxide. The reaction requires several hours at room temperature before conversion is complete and considerable hydrogen peroxide is present (*Analytical Chemistry*, Vol. 40, No. 11, September 1968, pages 1662–1667).

However, when the hydrolysis is carried out in accordance with the present invention utilizing the heat of solvation of sulfuric acid, the reaction is peculiarly speeded up and the desired peroxymonosulfate reaches maximum concentration in less than an hour. If the sulfuric acid and peroxydisulfate solution are mixed under room temperature conditions and then heated rapidly to about 150° F, the yield of peroxymonosulfate is only about 20%. For some reason, conducting the hydrolysis wherein the temperature is provided by the sulfuric acid heat of solvation plus the residual heat of the 100° F peroxydisulfate solution greatly accelerates the rate of conversion. By way of a theory, it is suggested that the heat of solvation spreads so rapidly throughout the preheated 100° F reaction zone that all reacting species are heated instantly to the optimum temperature, a condition not realized by heating the reaction zone by external means.

Reference is now made to the following non-limiting examples.

EXAMPLE 1

Hot water at about 140° F was added to 91.3 g of ammonium peroxydisulfate in a 300 ml tall form beaker with mild agitation. The final solution volume was about 200 ml. The peroxydisulfate was dissolved in about one minute. The resulting solution temperature was about 100° F.

The solution was transferred to a Dewar flask. After allowing for temperature stabilization i.e., about 5 minutes, 20 ml of concentrated sulfuric acid was added using a magnetic stirrer; temperature rose immediately to 140° F and stabilized at 158° F after 15 minutes. About 30 minutes after the sulfuric acid addition, the solution was transferred to a 250 ml Erlenmeyer flask and rapidly cooled to room temperature with running tap water.

The solution was analyzed and found to contain 0.04 m/l of peroxydisulfate, 1.41 m/l of peroxymonosulfate and 0.23 m/l of hydrogen peroxide. The net conversion of peroxydisulfate to peroxymonosulfate was calculated to be 77.5%.

EXAMPLE 2

An experiment similar to Example 1 was carried out, except 100 g of sodium peroxydisulfate was used. Similar temperature changes for the solution were observed. After 45 minutes, the solution was cooled to room temperature.

Analysis showed the resulting solution contained 0.03 m/l of peroxydisulfate, 1.55 m/l of peroxymonosulfate and 0.20 m/l of hydrogen peroxide. The net conversion of peroxydisulfate to peroxymonosulfate was calculated to be 81.6%.

EXAMPLE 3

A series of experiments similar to Example 2 were carried out except various sulfuric acid concentrations and reaction times were employed. Results are tabulated as follows:

| | | | CONVERSION OF SODIUM PEROXYDISULFATE TO PEROXYMONOSULFATE | | | |
|---|---|---|---|---|---|---|
| | | | Analysis | | | |
| $H_2SO_4$ ml | Resulting Temp. °F | Reaction Time, min. | $S_2O_8^=$ m/l | $HSO_5$ m/l | $H_2O_2$ m/l | Conversion % |
| 15 | 126–130 | 15 | 1.66 | .29 | .01 | 15.2 |
| 15 | 126–130 | 30 | .60 | 1.29 | .03 | 67.5 |
| 20 | 144–154 | 15 | .67 | 1.22 | .02 | 66.8 |
| 20 | 144–159 | 30 | .17 | 1.50 | .12 | 81.6 |
| 25 | 154–166 | 15 | .10 | 1.56 | .11 | 82.5 |
| 25 | 154–166 | 30 | .01 | 1.43 | .20 | 75.7 |

EXAMPLE 4

Hot water at 158° F was added to 45.5 g of ammonium peroxydisulfate to make a 100 ml solution in a 250 ml Erlenmeyer flask. About 10 ml sulfuric acid was then added with stirring. The resulting solution temperature of 148° to 154° F was maintained with hot running water. After 15 minutes, the solution was cooled to 75° F with cold running water.

Analysis showed the solution contained 0.53 m/l of peroxydisulfate, 1.16 m/l of peroxymonosulfate and 0.03 m/l of hydrogen peroxide. The net conversion was calculated to be 65.5%.

EXAMPLE 5

A 4 liter beaker equipped with a stainless steel cooling coil and a heater was used. Ammonium peroxydisulfate, about 912 g, was weighed out and transferred to the beaker. About 1.4 liters of hot tap water (about 140° F) was added; the final volume was about 2 liters. Peroxydisulfate was found to completely dissolve in about a minute and the final solution temperature was reduced to 99° F due to endothermic dissolution of peroxydisulfate.

When peroxydisulfate dissolution was completed, about 200 ml concentrated sulfuric acid was added with stirring using a magnetic stirrer. Within about 10 seconds, the solution temperature increased to 140° F. The solution temperature decreased to 136° F in six minutes due to heat losses through the uninsulated beaker wall. The heater in the beaker was turned on and off to compensate for the heat losses thereby maintaining the solution at 140° F. About 15 minutes after the sulfuric acid addition, the solution was cooled to 77° F by turning off the heater and running cold tap water through the cooling coil. The cooling took a total of four minutes.

The final solution was analyzed and found to contain 0.86 m/l of peroxydisulfate, 0.96 m/l of peroxymonosulfate and 0.02 m/l of hydrogen peroxide. The conversion from peroxydisulfate to peroxymonosulfate was calculated to be 52.2%.

Analytical Procedure

Hydrogen peroxide, peroxymonosulfate and peroxydisulfate were analyzed in a continual manner using the following procedure:

1. Pipet 1.0 ml sample into a 250 ml Erlenmeyer flask and add about 50 ml D.I. water.
2. Add about 10 ml of 5N sulfuric acid and three drops of ferroin indicator.
3. Titrate the solution (for hydrogen peroxide) with a 0.18N ceric ammonium sulfate solution ($Ce^{4+}$) from the orange color to pale blue. Note the titrant volume as $V_1$.
4. Add six drops of 0.01 m/l of osmium tetraoxide solution as a catalyst and add 50 ml of 0.1N acidified arsenic trioxide ($HAsO_2$) solution. The color will turn back to orange. Note the $HAsO_2$ volume as $V(HAsO_2)$.
5. Titrate the solution (for peroxymonosulfate) with a 0.18N ceric ammonium sulfate ($Ce^{4+}$) solution from the orange color to pale blue. Note the titrant volume as $V_2$.
6. Add 20 ml of 0.25N ferrous ammonium sulfate; the color will turn back to orange.
7. Titrate the solution (for peroxydisulfate) with 0.18N ceric ammonium sulfate ($Ce^{4+}$) solution from the orange color to pale blue. Note the titrant volume as $V_3$.
8. Add 20 ml of 0.25N ferrous ammonium sulfate and 50 ml D.I. water to another 250 ml Erlenmeyer flask and add three drops of ferroin indicator.
9. Titrate (a blank) with 0.18N ceric ammonium sulfate ($Ce^{4+}$) solution from the orange color to pale blue. Note the titrate volume as $V_b$.

Calculation

Hydrogen peroxide, $M/l = (V_1 \times N\, Ce^{4+})/2$
Peroxymonosulfate, $M/l = (V(HAsO_2) \times N(HAsO_2) - V_2 \times N\, Ce^{4+})/2$
Peroxydisulfate, $M/l = (V_b - V_3) \times N\, Ce^{4+}/2$

What is claimed is:

1. A method of preparing peroxymonosulfate by rapid hydrolysis of a peroxydisulfate with concentrated sulfuric acid, wherein active oxygen losses during said hydrolysis are suppressed, comprising the steps:
    a. providing a solution of a soluble peroxydisulfate at a temperature of about 100° F;
    b. mixing the peroxydisulfate solution of step (a) with concentrated sulfuric acid in a volume ratio of peroxydisulfate solution to concentrated sulfuric acid of 1 to 0.07 to 1 to 0.15, whereby the heat of solvation of the sulfuric acid initiates the hydrolysis reaction and produces a solution temperature between about 140° to 160° F;
    c. maintaining said solution temperature of 140° to 160° F for about 5 to 45 minutes; and
    d. rapidly cooling the reaction to about room temperature.

2. The method according to claim 1 wherein the soluble peroxydisulfate is sodium peroxydisulfate.

3. The method according to claim 1 wherein the soluble peroxydisulfate is ammonium peroxydisulfate.

* * * * *